United States Patent

Aaron

(10) Patent No.: US 7,933,607 B2
(45) Date of Patent: Apr. 26, 2011

(54) MANAGING MULTIPLE CELLULAR QUALITY OF SERVICE MECHANISMS

(75) Inventor: Jeffrey A. Aaron, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 495 days.

(21) Appl. No.: 12/142,151

(22) Filed: Jun. 19, 2008

(65) Prior Publication Data

US 2009/0318131 A1    Dec. 24, 2009

(51) Int. Cl.
*H04W 72/00* (2009.01)

(52) U.S. Cl. .............. 455/452.2; 455/432.1; 455/434; 455/435.1; 455/436; 455/442

(58) Field of Classification Search ....... 455/432.1–453, 455/455–456.4; 370/329–333
See application file for complete search history.

(56) References Cited

U.S. PATENT DOCUMENTS

| | | | | |
|---|---|---|---|---|
| 6,556,824 B1 * | 4/2003 | Purnadi et al. | ................ | 455/442 |
| 6,850,764 B1 * | 2/2005 | Patel | ........................... | 455/450 |
| 7,457,627 B2 * | 11/2008 | Knaebchen et al. | ........ | 455/452.2 |
| 2004/0057412 A1 * | 3/2004 | Curcio et al. | ................. | 370/341 |
| 2007/0002868 A1 * | 1/2007 | Qian et al. | ................ | 370/395.21 |
| 2008/0089354 A1 * | 4/2008 | Yoon et al. | .................... | 370/432 |
| 2010/0027542 A1 * | 2/2010 | Huang et al. | .................. | 370/390 |

* cited by examiner

*Primary Examiner* — Dai A Phuong
(74) *Attorney, Agent, or Firm* — Hope Baldauff Hartman, LLP

(57) ABSTRACT

Identification information, static inputs, and dynamic inputs are obtained. A plurality of potential situations are identified. Further, each of the plurality of potential situations being mapped to one or more quality of service (QoS) mechanisms. Relevant QoS mechanisms are determined by matching the obtained identification information, static inputs, and dynamic inputs with relevant situations in the plurality of potential situations. Groups of the relevant QoS mechanisms are identified. For each of the groups of the relevant QoS mechanisms, parameters associated with an operation of each of the relevant QoS mechanisms is adjusted based on the obtained identification information, static inputs, and dynamic inputs. A predicted effectiveness is evaluated for at least one of the groups of relevant QoS mechanisms in accordance with the adjusted parameters. One of the groups of relevant QoS mechanisms is selected based on the predicted effectiveness and is implemented.

20 Claims, 3 Drawing Sheets

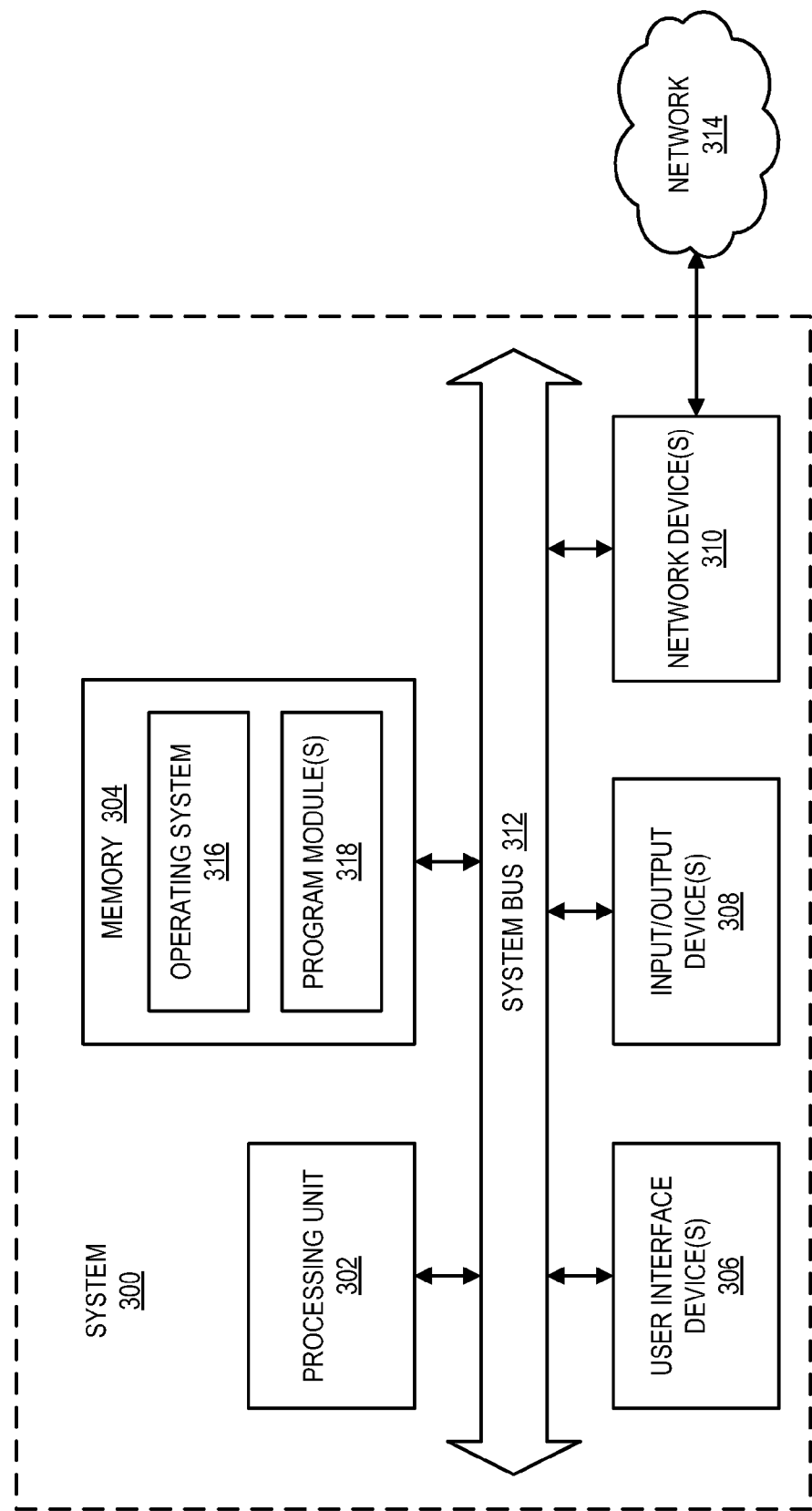

MANAGING MULTIPLE CELLULAR QUALITY OF SERVICE MECHANISMS

BACKGROUND

This application relates generally to the field of cellular-related quality of service. More specifically, the disclosure provided herein relates to coordinating and adapting multiple wireless quality of service ("QoS") mechanisms.

Cellular-related QoS issues are a significant source of frustration for service providers as well as their customers. Common QoS issues include bandwidth limitations, jitter, delay and latency, packet loss, and interference. QoS issues may result in a number of problems for customers, potentially causing customers to change service providers. In one example, a customer may experience a "dropped call," in which a phone call unexpectedly ends. In another example, a customer may experience a slow data transfer rate that is not suitable for transferring high-bandwidth content, such as video and music. QoS problems may result in unacceptable quality of service, causing customer dissatisfaction ranging from annoyance to anger.

In addition to conventional cellular services, such as voice and text messages, modern cellular devices are capable of, among other things, playing music, displaying video, surfing the Internet, and other bandwidth intensive applications. As broadband Internet access has become more pervasive at home and in the office, an increasing number of cellular customers are demanding that their cellular networks be able to provide similar speed and throughput as other broadband technologies, such as digital subscriber line ("DSL") and cable modem. In particular, cellular customers commonly use their cellular devices to access real-time and near real-time multimedia and other high bandwidth content for business (e.g., virtual meetings) and pleasure (e.g., streaming music and video).

In many cases, cellular customers demand a high quality of service ("QoS") and pay a premium to receive a high QoS. For example, business users who utilize cellular services for mission critical applications may demand that a minimum bandwidth be available during peak business hours (e.g., weekdays from 8 am to 5 pm). In order to provide these business customers with sufficient bandwidth, cellular service providers often face a variety of QoS challenges which can detrimentally affect QoS. One common QoS challenge is that cellular resources are generally limited. For example, the amount of bandwidth provided by cellular towers in a given area may be fixed. Another common QoS challenge is that cellular devices inherently move, sometimes to locations that are detrimental to cellular QoS. For example, a user may move to a location that creates a substantial amount of interference created by other users or obstacles.

In order to address these QoS challenges, cellular service providers may implement QoS mechanisms in order to improve QoS. A QoS mechanism may be implemented in hardware, firmware, software, or combinations thereof. Further, a QoS mechanism may be implemented at a cellular tower and/or at a cellular device. Traditionally, QoS mechanisms have been limited to improving conventional cellular services, such as voice and text messages. However, these conventional QoS mechanisms do not address QoS challenges related to high bandwidth cellular transmissions, such as streaming music and video. An example of a QoS challenge related to high bandwidth cellular transmissions is a large and uncontrollable variation in radio frequency ("RF") link conditions that reduces bandwidth. As such, cellular service providers are implementing new QoS mechanisms designed to address QoS challenges related to high bandwidth cellular transmissions.

Many new QoS mechanisms are designed and implemented to address a limited problem or a limited subset of problems related to high bandwidth cellular transmissions. For example, one QoS mechanism may be designed and implemented to address co-interference caused by surrounding cellular devices. Another QoS mechanism may be designed and implemented to address large surrounding obstacles, such as skyscrapers, that may block RF signals. Typically, these QoS mechanisms are separately controlled and implemented. In many cases, cellular service providers will only implement selected QoS mechanisms, fearing that managing too many QoS mechanisms may become too complicated.

SUMMARY

Embodiments of the disclosure presented herein include methods, systems, and computer-readable media for managing multiple cellular QoS mechanisms. According to one aspect, a method for managing multiple QoS mechanisms is provided. According to the method, identification information is obtained. The identification information may include information regarding a plurality of cellular users and a plurality of cellular devices associated with the cellular users. For each of the plurality of cellular devices, static inputs as well as dynamic inputs are also obtained. A plurality of potential situations are identified. Each of the plurality of potential situations may be defined in terms of identification information, static inputs, and dynamic inputs. Further, each of the plurality of potential situations may be mapped to one or more QoS mechanisms. Relevant QoS mechanisms are determined by matching the obtained identification information, static inputs, and dynamic inputs with relevant situations in the plurality of potential situations. Groups of the relevant QoS mechanisms are identified. For each of the groups of the relevant QoS mechanisms, parameters associated with an operation of each of the relevant QoS mechanisms is adjusted based on the obtained identification information, static inputs, and dynamic inputs. A predicted effectiveness is evaluated for at least one of the groups of relevant QoS mechanisms in accordance with the adjusted parameters. One of the groups of relevant QoS mechanisms is selected based on the predicted effectiveness for implementing the selected group of relevant QoS mechanisms.

According to another aspect, a system for managing multiple QoS mechanisms is provided. The system includes a memory and a processor functionally coupled to the memory. The memory stores a program containing code for managing multiple QoS mechanisms. The processor is responsive to computer-executable instructions contained in the program and operative to obtain identification information regarding a plurality of cellular users and a plurality of cellular devices associated with the cellular users; for each of the plurality of cellular devices, obtain static inputs; for each of the plurality of cellular devices, obtain dynamic inputs; identify a plurality of potential situations defined in terms of identification information, static inputs, and dynamic inputs, each of the plurality of potential situations being mapped to one or more QoS mechanisms; determine relevant QoS mechanisms by matching the obtained identification information, static inputs, and dynamic inputs with relevant situations in the plurality of potential situations; identify groups of the relevant QoS mechanisms; for each of the groups of the relevant QoS mechanisms, adjust parameters associated with an operation of each of the relevant QoS mechanisms based on the obtained identification information, static inputs, and dynamic inputs; evaluate a predicted effectiveness for at least one of the groups of relevant QoS mechanisms in accordance with the adjusted parameters; select one of the groups of relevant QoS mechanisms based on the predicted effectiveness; and implement the selected group of relevant QoS mechanisms.

According to yet another aspect, a computer-readable medium having instructions stored thereon for execution by a processor to perform a method for managing multiple QoS mechanisms is provided. According to the method, identification information is obtained. The identification information may include information regarding a plurality of cellular users and a plurality of cellular devices associated with the cellular users. For each of the plurality of cellular devices, static inputs as well as dynamic inputs are also obtained. A plurality of potential situations are identified. Each of the plurality of potential situations may be defined in terms of identification information, static inputs, and dynamic inputs. Further, each of the plurality of potential situations may be mapped to one or more QoS mechanisms. Relevant QoS mechanisms are determined by matching the obtained identification information, static inputs, and dynamic inputs with relevant situations in the plurality of potential situations. Groups of the relevant QoS mechanisms are identified. For each of the groups of the relevant QoS mechanisms, parameters associated with an operation of each of the relevant QoS mechanisms is adjusted based on the obtained identification information, static inputs, and dynamic inputs. A predicted effectiveness is evaluated for at least one of the groups of relevant QoS mechanisms in accordance with the adjusted parameters. One of the groups of relevant QoS mechanisms is selected based on the predicted effectiveness for implementing the selected group of relevant QoS mechanisms.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 3 is a block diagram illustrating the system configured to manage QoS mechanisms, in accordance with exemplary embodiments.

DETAILED DESCRIPTION

Figure 1:
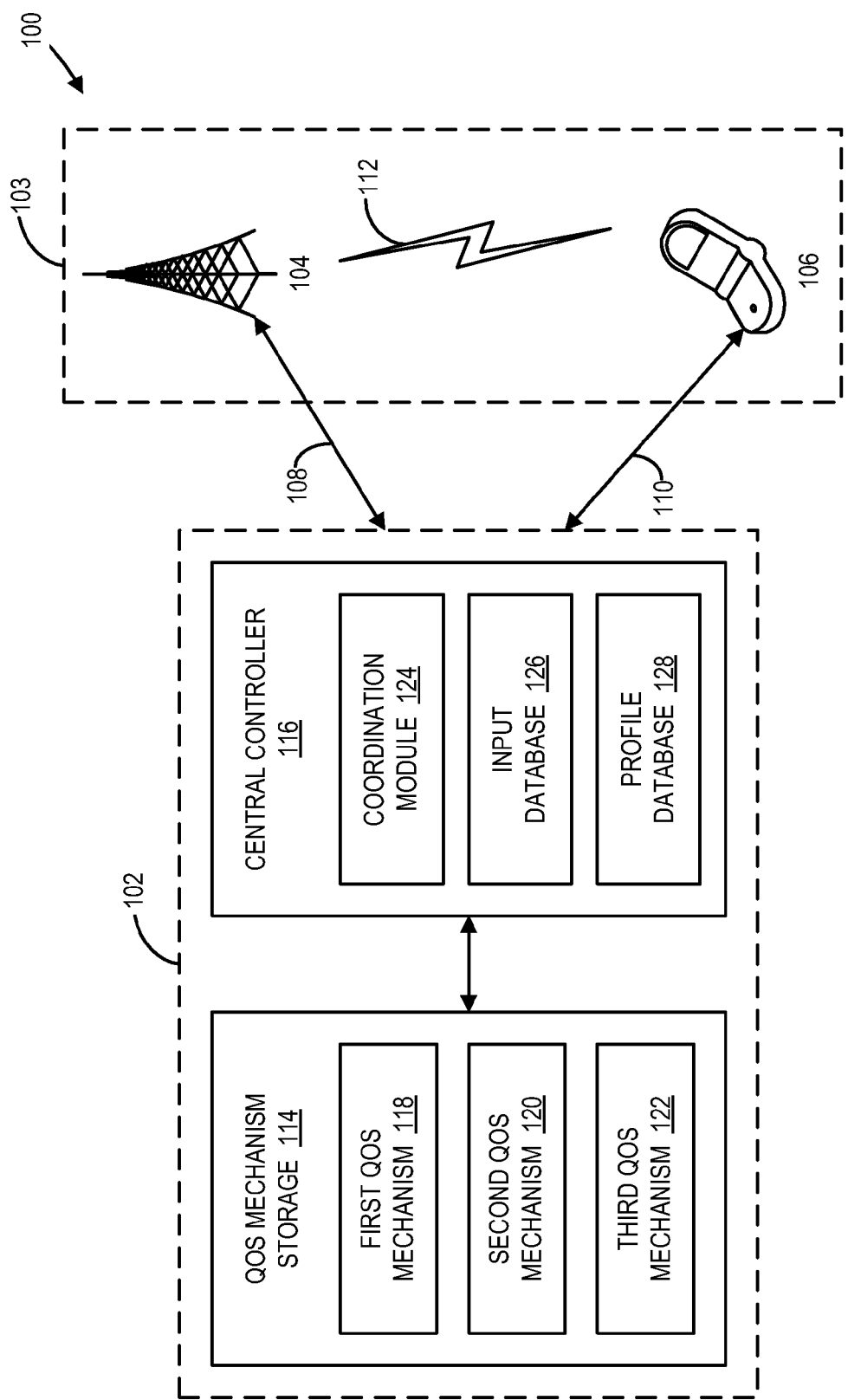
FIG. 1 is a simplified diagram illustrating a cellular network architecture adapted to manage and implement QoS mechanisms through a cellular network, in accordance with exemplary embodiments.

The following detailed description is directed to methods, systems, and computer-readable media for managing multiple cellular quality of service ("QoS") mechanisms (hereinafter "QoS mechanisms"). In particular, aspects of a central controller for coordinating, adapting, and implementing multiple QoS mechanisms will be disclosed. The central controller may be adapted to select relevant QoS mechanisms from a plurality of available QoS mechanisms based on a variety of information collected from a cellular network. Upon selecting the relevant QoS mechanisms, the central controller may group related QoS mechanisms and appropriately adjust the operation of the QoS mechanism to achieve an optimal effectiveness. The central controller may then select and implement one of the grouped QoS mechanisms in accordance with the information collected from the cellular network.

As used herein, a QoS mechanism refers to any suitable mechanism capable of improving or purposely affecting QoS. Also, as used herein, a grouping (or group) of mechanisms may include organizing and utilizing such mechanisms on a timeline such as a schedule, for instance, in a sequence; repetitive utilization of a mechanism in a particular grouping; and changing parameters of such mechanisms, including with respect to changing parameters for subsequent repetitive utilizations. Mechanism parameters can vary by mechanism, but basically include any and all controllable aspects of a mechanism such as step sizes, variable values, update rates, trigger types, etc.

Exemplary QoS mechanisms are described in U.S. patent application Ser. No. 11/864,209 entitled "Methods, Systems, and Computer-Readable Media for Providing Cellular Handoff" and filed on Sep. 28, 2007; Ser. No. 11/864,293 entitled "Methods, Systems, and Computer-Readable Media for Utilizing a Repeating Function to Improve Quality of Service" and filed on Sep. 28, 2007; Ser. No. 11/863,787 entitled "Methods, Systems, and Computer-Readable Media for Providing Multiple Communication Paths" and filed on Sep. 28, 2007; Ser. No. 11/863,890 entitled "Methods, Systems, and Computer-Readable Media for Reserving a Cellular Resource" and filed on Sep. 28, 2007; Ser. No. 11/863,980 entitled "Methods, Systems, and Computer-Readable Media for Adapting a Quality of Service Mechanism Based on Feedback" and filed on Sep. 28, 2007; Ser. No. 11/943,250 entitled "Methods, Systems, and Computer-Readable Media for Mitigating a Temporary Interference Condition" and filed on Nov. 20, 2007; Ser. No. 11/955,810 entitled "Reducing Bandwidth When Transmitting Content to a Cellular Device" and filed on Dec. 13, 2007; Ser. No. 12/024,639 entitled "Reducing Co-Interference by Hushing Selective Cellular Devices" and filed on Feb. 1, 2008; Ser. No. 12/024,660 entitled "Content Forwarding for Bandwidth Conservation" and filed on Feb. 1, 2008; and Ser. No. 12/024,677 entitled "Improving Quality of Service for Grouped Cellular Devices" and filed on Feb. 1, 2008. These patent applications, which are assigned to the same assignee as the instant application, are incorporated herein by reference in their entirety. It should be appreciated that these patent applications are mentioned in this disclosure merely for illustrative purposes. Other suitable QoS mechanisms may be similarly utilized as contemplated by those skilled in the art.

In the following detailed description, references are made to the accompanying drawings that form a part hereof, and which are shown by way of illustration through specific embodiments or examples. Referring now to the drawings, it is to be understood that like numerals represent like elements through the several figures, and that not all components and/or steps described and illustrated with reference to the figures are required for all embodiments. Referring now to FIG. 1, a simplified cellular network architecture 100 is shown, in accordance with exemplary embodiments. The cellular network architecture 100 includes a computer system 102 operatively coupled to a cellular network 103, which includes a cellular tower 104 and a cellular device 106. The computer system 102 may communicate with the cellular tower 104 and the cellular device 106 via communications links 108, 110 respectively. The communications links 108, 110 may each operate on any suitable wired or wireless computer network utilizing any suitable communications protocols. The cellular tower 104 and the cellular device 106 may communicate via a radio frequency ("RF") link 112. The cellular device 106 may be a cellular phone, a personal digital assistant ("PDA"), a smartphone, or other suitable cellular device. It should be appreciated that although the cellular network 103 of FIG. 1 includes only one cellular tower 104 and one cellular device 106, the cellular network 103 may include any number of cellular towers and any number of cellular devices 106 according to other embodiments. Further, the cellular network 103 may include RF links not only between a given cellular tower and a given cellular device, but also RF links between multiple cellular devices (i.e., peer-to-peer communications).

The computer system 102 includes a QoS mechanism storage 114 and a central controller 116. As illustrated in FIG. 1, the QoS mechanism storage 114 is a database adapted to store one or more QoS mechanisms, such as a first QoS mechanism 118, a second QoS mechanism 120, and a third QoS mechanism 122. As previously mentioned, QoS mechanisms, such as the QoS mechanisms 118, 120, 122, may be any suitable mechanism for improving cellular QoS at the cellular network 103. The QoS mechanisms 118, 120, 122 may be implemented through the cellular tower 104 and/or the cellular device 106. Further, the QoS mechanisms 118, 120, 122 may be implemented as hardware, software, firmware, or combinations thereof. The central controller 116 includes a coordination module 124, an input database 126, and a profile database 128. In one embodiment, the coordination module 124 is adapted to coordinate, adapt, and implement QoS mechanisms, such as the QoS mechanisms 118, 120, 122, through the cellular tower 104 and/or the cellular device 106.

The coordination module 124 may be further adapted to receive inputs from the cellular tower 104 and/or the cellular device 106 and to store the inputs in the input database 126. As used herein, an input refers to a condition at the cellular tower 104, the cellular device 106, and/or at the RF link 112 that may detrimentally affect cellular QoS at the cellular network 103. The inputs may include static inputs, which are inputs that do not change or change at a relatively slower rate, and dynamic inputs, which are inputs that change at a relatively faster rate than the static inputs.

In one embodiment, static inputs are categorized as descriptive, historical, and topological. Descriptive static inputs may include a username or other unique identifier and user profile information, such as allowed access information, allowed service information, QoS-related priorities, and billing plans. Historical static inputs may include user location history and device usage history, such as the types of services used, where the services were used, how long the services were used, and whether connections were lost. Topological static inputs may include information regarding whether the device was used in an urban area, a suburban area, country, hilly terrain, or flat terrain.

Dynamic inputs may include current user location (e.g., determined via GPS and/or triangulation and/or a particular tower/cell/sector), current variation in and change of user location (e.g., speed, direction, degree of constancy and pauses with respect to both speed and direction/angle), and current user utilization (e.g., active services, in-process call/connections/sessions, associated bandwidths/data rates). Dynamic inputs may include area/cell wireless conditions, radio link conditions, proximities (e.g., distances and distance-rate-of-change), and geometries (e.g., angles and angular-rate-of-change between user and tower, user & other towers, various users). Examples of area cell wireless conditions may include noise (e.g., noise levels, types and spectral characteristics of noise), user load (e.g., number of users, number of various types of users, number of users utilizing various applications/services), and variation in user load (e.g., change in various user load metrics per one second, ten seconds, thirty seconds, minute, hour, and day intervals). Examples of radio link conditions may include signal and noise levels, signal-to-noise ("SNR") ratio, and degree of SNR variation), especially for links. The radio link conditions may include conditions between the user and cell tower, between the user and other reachable cell towers, and between the user and other reachable users In one embodiment, inputs received by the coordination module 124 may be mapped to one or more situation profiles stored in the profile database 128. As used herein, a situation profile refers to a predefined group of inputs that corresponds to one or more QoS mechanisms. These situation profiles enable the coordination module 124 to easily determine the appropriate QoS mechanisms applicable to any given group of received inputs.

Upon determining the relevant QoS mechanisms that apply to the received inputs based on the situation profiles, the coordination module 124 may determine appropriate groups of QoS mechanisms. For example, a group may be formed that includes the QoS mechanisms 118, 120, 122 because the QoS mechanisms 118, 120, 122 are compatible and do not cause any conflicts when implemented together. For each group of QoS mechanisms, the coordination module 124 may adjust and optimize parameters associated with each QoS mechanism within the group based on the received inputs. The coordination module 124 may evaluate a predicted effectiveness for each of the plurality of groups, select the group with the highest predicted effectiveness, and implement the selected group through the cellular tower 104 and/or the cellular device 106.

Upon implementing the selected group, the coordination module 124 may repeat the aforementioned process beginning with receiving inputs from the cellular tower 104 and/or the cellular device 106. By repeating the aforementioned process, the group of QoS mechanisms being implemented can be changed to address a wider variety of QoS issues. For example, the aforementioned process may repeat periodically or upon an occurrence of a predefined trigger, such as a change in a condition at the cellular network 103. The operation of the coordination module 124 with respect to the inputs stored in the input database 126 and the situation profiles stored in the profile database 128 are further described below with reference to FIG. 2.

Figure 2:
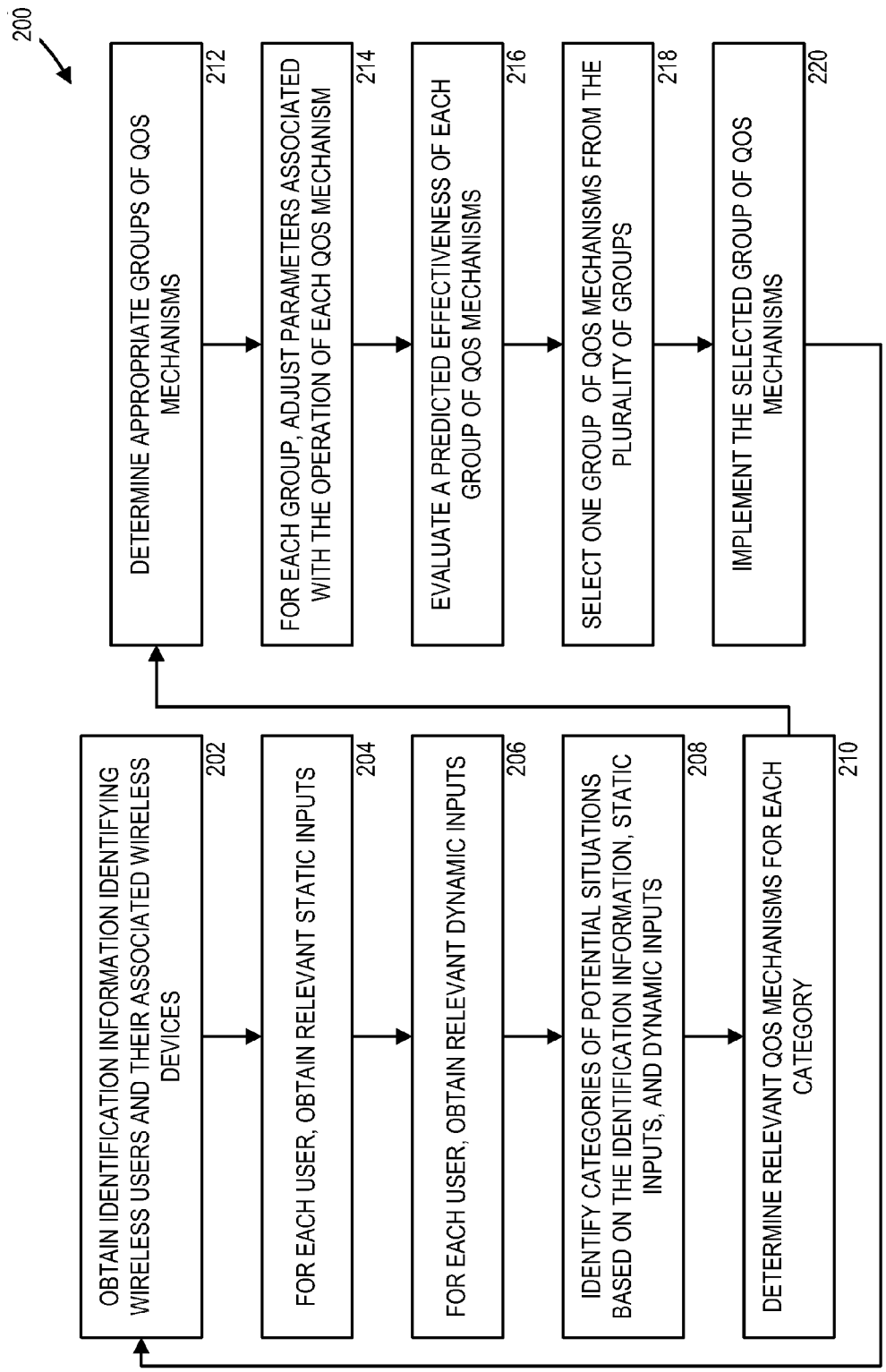
FIG. 2 is a flow diagram illustrating a method for managing multiple QoS mechanisms, in accordance with exemplary embodiments.

Referring now to FIG. 2, additional aspects regarding the operation of the coordination module 124 will be described. In particular, FIG. 2 illustrates an exemplary method 200 for managing multiple QoS mechanisms, such as the QoS mechanisms 118, 120, 122, in accordance with exemplary embodiments. According to the method 200, the coordination module 124 obtains (at 202) identification information, which identifies multiple cellular users as well as their associated cellular devices, such as the cellular device 106. The identification information for a given cellular device, such as the cellular device 106, may include, but is not limited to, the cell in which the cellular device 106 located, the sector in which the cellular device 106 is located, the corresponding base station controller serving the cellular device 106, the service provider to which the cellular device 106 is subscribed, and the service provider currently providing service to the cellular device 106 (e.g., if the cellular device 106 is roaming).

In addition to gathering the identification information, the coordination module 124 may obtain (at 204, 206) relevant static inputs and relevant dynamic inputs regarding the multiple cellular users. The static inputs and the dynamic inputs may be obtained from the cellular tower 104, the cellular device 106, or other suitable device or database (not shown). As previously mentioned, a static input refers to a QoS condition (i.e., a condition affecting QoS) that does not change or changes at a slower rate than a dynamic input. Examples of static inputs include, but are not limited to, general user information, device history regarding the cellular device 106, and topological information regarding the current and/or anticipated future locations of the cellular device 106. For a given cellular device, such as the cellular device 106, the general user information may include, for example, a user identifier (e.g., a username) associated with an owner of the cellular device 106 and a user profile specifying the owner's service plan and associated QoS requirements (e.g., a minimum amount of available bandwidth or throughput). The device history may include, for example, the location history of the cellular device 106 and the usage history (e.g., the types of services used, the length at which the services were used, the location at which the services were used, whether a connection was lost, etc.) of the cellular device 106. The topological information may include, for example, whether the current and/or anticipated future locations of the cellular device 106 are in urban, suburban, or rural areas. The topical information may also include whether the current and/or anticipated future locations of the cellular device 106 include flat, hilly, or mountainous terrain. It should be appreciated that even though the location of the cellular device 106 may change relatively quickly in some instances (e.g., the user of the cellular device 106 is in a car), the terrain in which the cellular device 106 is located is likely to change at a significantly slower rate.

As previously mentioned, a dynamic input refers to a QoS condition that changes at a faster rate than a static input. Examples of dynamic inputs include, but are not limited to, a user's current location, variation information regarding the user's current location, utilization information regarding the cellular device 106, cell conditions regarding the cell in which the cellular device 106 is located, RF link conditions regarding the RF link 112, proximity information between the cellular tower 104 and the cellular device 106, and geometry information between the cellular tower 104 and the cellular device 106. For a given cellular device, such as the cellular device 106, the user's current location may be determined via a global position system ("GPS"), triangulation, or other suitable technique available to the cellular device 106. The variation information may be utilized to determine the rate of change in the user's current location as well as to predict the user's anticipated locations in the future. The variation information may include the speed at which the cellular device 106 is moving, the direction in which the cellular device 106 is moving, and the degree of constancy and pauses with respect to the speed and the direction. The utilization information may include active services, such as voice calls, text messaging, and Internet browsing, being utilized by the cellular device 106 and the bandwidth utilized by the cellular device 106 to implement these services.

The cell conditions may include noise information, load information, and variation information on the user's load. The noise information may include, for example, the level of noise, the type of noise, and the spectral characteristics of the noise. The load information may include, for example, the number of users in the cell, the types of users in the cell, and the types of applications being utilized by the users in the cell. The variation information may include, for example, variations in suitable load metrics over given intervals. The RF link conditions may include signal and noise levels, signal-to-noise ratios, and the rate at which the signal-to-noise ratios change. The RF link conditions may be based on RF links, such as the RF link 112, between the cellular tower 104 and the cellular device 106, as well as RF links between cellular device 106 and other reachable cellular towers and between the cellular device 106 and other reachable cellular devices. The proximity information may include the distance information and the rate at which the distance information changes. The distance information may include the distance between the cellular tower 104 and the cellular device 106, the distances between the cellular device 106 and other reachable cellular towers, and the distances between the cellular device 106 and other reachable cellular devices. The geometric information may include angle information and the rate at which the angle information changes. The angle information may include the angle between the cellular tower 104 and the cellular device 106, the angles between the cellular device 106 and other reachable cellular towers, and the angles between the cellular device 106 and other reachable cellular devices.

For each of the multiple cellular users, the coordination module 124 may identify (at 208) categories of potential QoS situations (i.e., situations in which QoS may be detrimentally affected) according to predefined combinations of identification information, static inputs, and dynamic inputs. Each of these categories may be mapped to one or more relevant QoS mechanisms, such as the QoS mechanisms 118, 120, 122, that can resolve the potential QoS situations. In this way, the coordination module 124 can easily determine which QoS mechanisms are relevant based on the identification information received at operation 202, the static inputs received at operation 204, and the dynamic inputs received at operation 206.

The potential QoS situations may be defined based on suitable rules and thresholds relevant to the various QoS mechanisms. These rules and thresholds may be based on the same rules and thresholds that define the identification information, the static inputs, and the dynamic inputs, as previously described. The rules and thresholds may also account for limitations in the QoS mechanisms. For example, if a given QoS mechanism resolves co-interference between cellular devices within a given proximity, then the corresponding QoS situation may be defined as being applicable when cellular devices are within the given proximity. If a given QoS mechanism resolves for a particular cellular device QoS issues caused by skyscrapers by utilizing nearby cellular devices, then the corresponding QoS situation may be defined as being applicable when the particular cellular device is located in an urban area and other cellular devices are nearby. In this case, if other cellular devices are not nearby, then the QoS mechanism cannot be utilized even if the particular cellular device is in an urban area.

Upon receiving the identification information, the static inputs, and the dynamic inputs, the categorization module 124 may determine (at 210) the relevant QoS mechanisms applicable to the identification information, the static inputs, and the dynamic inputs that are received. As previously mentioned, each of the potential situations is mapped to one or more QoS mechanisms. These are referred herein as situation-specific QoS mechanisms. By matching portions of the received identification information, static inputs, and dynamic inputs to the corresponding potential situations, the relevant situation-specific QoS mechanisms can be determined. Other relevant QoS mechanisms may include fundamental QoS mechanisms and modifying QoS mechanisms.

Fundamental QoS mechanisms may include QoS mechanisms that are necessary for multiple or all QoS situations. Modifying QoS mechanisms may include QoS mechanisms that modify other QoS mechanisms.

An example of a fundamental QoS mechanism may include cellular handoff mechanisms in which QoS of a cellular device is improved by utilizing nearby cellular devices. In this case, the cellular handoff mechanism can apply to all situations in which QoS is affected, assuming nearby cellular devices are available. An example of a modifying QoS mechanism would be any suitable mechanism that adjusted a QoS mechanism. For example, an exemplary modifying QoS mechanism may adjust the amount of hushing performed depending on varying external conditions.

Upon determining the relevant QoS mechanisms, the coordination module 124 determines (at 212) appropriate groups of QoS mechanisms. The QoS mechanisms may be grouped according to any suitable rules. In one embodiment, QoS mechanisms that compliment each other may be grouped. For example, situation-specific QoS mechanisms may be grouped with corresponding fundamental QoS mechanisms and corresponding modifying QoS mechanisms. Also, QoS mechanisms that involve similar actions and do not conflict may be grouped together so that the actions are not repeated to implement multiple QoS mechanisms. Further, QoS mechanisms that conflict or are otherwise incompatible with each other may be removed from groups.

For each group that is formed, the coordination module 124 may adjust (at 214) and optimize parameters associated with the operation of each of the QoS mechanisms. The parameters may be adjusted and optimized based on the received identification information, static inputs, and dynamic inputs. In one embodiment, the parameters of each individual QoS mechanism in the group are adjusted accordingly. Then, the parameters are readjusted or fine-tuned according to the group. For example, the coordination module 124 may account for shared resources and similar actions of an entire group.

Upon adjusting and optimizing the parameters for each group of QoS mechanisms, the coordination module 124 may evaluate (at 216) a predicted effectiveness for each group of QoS mechanisms. The predicted effectiveness may be determined based on any heuristic methods and other suitable techniques. In one embodiment, the coordination module 124 determines the predicted effectiveness by evaluating a ratio or other suitable metric between a predicted positive effect of implementing the group of QoS mechanisms and a predicted negative effect of implementing the group of QoS mechanisms. For example, the predicted positive effect may be based on the amount of bandwidth that is gained by implementing the group of QoS mechanisms, and the predicted negative effect may be based on the amount of additional power utilized to implement the group of QoS mechanisms.

Upon determining a metric for each of the groups of QoS mechanisms, the coordination module 124 may select (at 218) the group of QoS mechanisms with the best metric. For example, the coordination module 124 may select the group of QoS mechanisms with the highest ratio of predicted positive effect to the predicted negative effect. Upon selecting the group of QoS mechanism with the best metric, the coordination module 124 may implement (at 220) the selected group by implementing each QoS mechanism in the group. After completing operations 202, 204, 206, 208, 210, 212, 214, 216, 218, 220, the coordination module 124 may repeat the method 200 beginning at operation 202, obtaining identification information. The return to the beginning of the method 200 may occur after a given time frame or upon a predefined trigger. For example, the coordination module 124 may return to beginning of the method 200 if a change in the cellular network 103 occurs that causes a drop in QoS.

FIG. 3 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 3 is a block diagram illustrating a computer system 300 configured to reduce bandwidth when transmitting content to a cellular device, in accordance with exemplary embodiments. Examples of the computer system 300 may include the computer system 102 and the cellular device 106. The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 304 communicates with the processing unit 302 via the system bus 312. In one embodiment, the memory 304 is operatively connected to a memory controller (not shown) that enables communication with the processing unit 302 via the system bus 312. The memory 304 includes an operating system 316 and one or more program modules 318, according to exemplary embodiments. Examples of operating systems, such as the operating system 316, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. Examples of the program modules 318 include the first QoS mechanism 118, the second QoS mechanism 120, and the third QoS mechanism 122. In one embodiment, the program modules 318 are embodied in computer-readable media containing instructions that, when executed by the processing unit 302, performs the method 200 for managing multiple QoS mechanisms, as described in greater detail above with respect to FIG. 2. According to further embodiments, the program modules 318 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 318. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

The network devices 310 enable the computer system 300 to communicate with other networks or remote systems via a network 314. Examples of the network 314 may include, but are not limited to, the communications links 208, 210 and RF link 112. Examples of the network devices 310 may include, but are not limited to, a modem, a radio frequency ("RF") or infrared ("IR") transceiver, a telephonic interface, a bridge, a router, or a network card. The network 314 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 314 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for managing multiple quality of service ("QoS") mechanisms, comprising:
    obtaining identification information regarding a plurality of cellular users and a plurality of cellular devices associated with the cellular users;
    for each of the plurality of cellular devices, obtaining static inputs;
    for each of the plurality of cellular devices, obtaining dynamic inputs;
    identifying a plurality of potential situations defined in terms of the identification information, the static inputs, and the dynamic inputs, each of the plurality of potential situations being mapped to one or more QoS mechanisms;
    determining relevant QoS mechanisms by matching the obtained identification information, the static inputs, and the dynamic inputs with relevant situations in the plurality of potential situations;
    identifying groups of the relevant QoS mechanisms;
    for at least one of the groups of the relevant QoS mechanisms, adjusting parameters associated with an operation of each of the relevant QoS mechanisms based on the obtained identification information, static inputs, and dynamic inputs;
    evaluating a predicted effectiveness for the at least one of the groups of relevant QoS mechanisms in accordance with the adjusted parameters; and
    selecting one of the at least one of the groups of relevant QoS mechanisms based on the predicted effectiveness for implementing the selected group of relevant QoS mechanisms.

2. The method of claim 1, wherein each of the one or more QoS mechanisms comprises a mechanism for improving QoS of the plurality of cellular devices.

3. The method of claim 1, wherein the static inputs comprises at least one of a descriptive input providing a user profile associated with a cellular device, a history input providing a usage history and a location history of the cellular device, and a topological input providing topological information regarding a location of the cellular device.

4. The method of claim 1, wherein the dynamic inputs comprises at least one of a current location of a cellular device, a current utilization of the cellular device, conditions of a cell in which the cellular device is located, and conditions of radio frequency (RF) links associated with the cellular device.

5. The method of claim 1, wherein the one or more QoS mechanisms comprise a situation-specific mechanism that is associated with one of the plurality of potential situations, a fundamental mechanism that is associated with multiple situations of the plurality of potential situations, and a modifying mechanism that modifies the situation-specific mechanism or the fundamental mechanism.

6. The method of claim 1, wherein evaluating a predicted effectiveness for the at least one of the groups of relevant QoS mechanisms in accordance with the adjusted parameters comprises:
    determining a predicted positive effect of implementing the at least one of the groups of relevant QoS mechanisms;
    determining a predicted negative effect of implementing the at least one of the groups of relevant QoS mechanisms; and
    wherein selecting one of the at least one of the groups of relevant QoS mechanisms based on the predicted effectiveness comprises selecting one of the at least one of the groups of relevant QoS mechanisms with a highest ratio of the predicted positive effect to the predicted negative effect.

7. The method of claim 1, further comprising re-selecting one of the groups of relevant QoS mechanisms to be implemented upon an occurrence of a trigger.

8. A system for managing multiple quality of service ("QoS") mechanisms, comprising:
a memory for storing a program containing code for managing multiple QoS mechanisms;
a processor functionally coupled to the memory, the processor being responsive to computer-executable instructions contained in the program and operative to:
obtain identification information regarding a plurality of cellular users and a plurality of cellular devices associated with the cellular users,
for each of the plurality of cellular devices, obtain static inputs,
for each of the plurality of cellular devices, obtain dynamic inputs,
identify a plurality of potential situations defined in terms of the identification information, the static inputs, and the dynamic inputs, each of the plurality of potential situations being mapped to one or more QoS mechanisms,
determine relevant QoS mechanisms by matching the obtained identification information, the static inputs, and the dynamic inputs with relevant situations in the plurality of potential situations,
identify groups of the relevant QoS mechanisms,
for at least one of the groups of the relevant QoS mechanisms, adjust parameters associated with an operation of each of the relevant QoS mechanisms based on the obtained identification information, static inputs, and dynamic inputs,
evaluate a predicted effectiveness for the at least one of the groups of relevant QoS mechanisms in accordance with the adjusted parameters, and
select one of the at least one of the groups of relevant QoS mechanisms based on the predicted effectiveness for implementing the selected group of relevant QoS mechanisms.

9. The system of claim 8, wherein each of the one or more QoS mechanisms comprises a mechanism for improving QoS of the plurality of cellular devices.

10. The system of claim 8, wherein the static inputs comprises at least one of a descriptive input providing a user profile associated with a cellular device, a history input providing a usage history and a location history of the cellular device, and a topological input providing topological information regarding a location of the cellular device.

11. The system of claim 8, wherein the dynamic inputs comprises at least one of a current location of a cellular device, a current utilization of the cellular device, conditions of a cell in which the cellular device is located, and conditions of radio frequency (RF) links associated with the cellular device.

12. The system of claim 8, wherein the one or more QoS mechanisms comprise a situation-specific mechanism that is associated with one of the plurality of potential situations, a fundamental mechanism that is associated with multiple situations of the plurality of potential situations, and a modifying mechanism that modifies the situation-specific mechanism or the fundamental mechanism.

13. The system of claim 8, wherein to evaluate a predicted effectiveness for at least one of the groups of relevant QoS mechanisms in accordance with the adjusted parameters, the processor is further operative to:
determine a predicted positive effect of implementing the at least one of the groups of relevant QoS mechanisms,
determine a predicted negative effect of implementing the at least one of the groups of relevant QoS mechanisms, and
wherein to select one of the at least one of the groups of relevant QoS mechanisms based on the predicted effectiveness, the processor is further operative to select one of the at least one of the groups of relevant QoS mechanisms with a highest ratio of the predicted positive effect to the predicted negative effect.

14. A computer-readable medium having instructions stored thereon for execution by a processor to provide a method for reducing bandwidth when transmitting content to a cellular device, the method comprising:
obtaining identification information regarding a plurality of cellular users and a plurality of cellular devices associated with the cellular users;
for each of the plurality of cellular devices, obtaining static inputs;
for each of the plurality of cellular devices, obtaining dynamic inputs;
identifying a plurality of potential situations defined in terms of the identification information, the static inputs, and the dynamic inputs, each of the plurality of potential situations being mapped to one or more QoS mechanisms;
determining relevant QoS mechanisms by matching the obtained identification information, the static inputs, and the dynamic inputs with relevant situations in the plurality of potential situations;
identifying groups of the relevant QoS mechanisms;
for at least one of the groups of the relevant QoS mechanisms, adjusting parameters associated with an operation of each of the relevant QoS mechanisms based on the obtained identification information, static inputs, and dynamic inputs;
evaluating a predicted effectiveness for the at least one of the groups of relevant QoS mechanisms in accordance with the adjusted parameters; and
selecting one of the at least one of the groups of relevant QoS mechanisms based on the predicted effectiveness for implementing the selected group of relevant QoS mechanisms.

15. The computer-readable medium of claim 14, wherein each of the one or more QoS mechanisms comprises a mechanism for improving QoS of the plurality of cellular devices.

16. The computer-readable medium of claim 14, wherein the static inputs comprises at least one of a descriptive input providing a user profile associated with a cellular device, a history input providing a usage history and a location history of the cellular device, and a topological input providing topological information regarding a location of the cellular device.

17. The computer-readable medium of claim 14, wherein the dynamic inputs comprises at least one of a current location of a cellular device, a current utilization of the cellular device, conditions of a cell in which the cellular device is located, and conditions of radio frequency (RF) links associated with the cellular device.

18. The computer-readable medium of claim 14, wherein the one or more QoS mechanisms comprise a situation-specific mechanism that is associated with one of the plurality of potential situations, a fundamental mechanism that is associated with multiple situations of the plurality of potential situations, and a modifying mechanism that modifies the situation-specific mechanism or the fundamental mechanism.

19. The computer-readable medium of claim 14, wherein evaluating a predicted effectiveness for at least one of the groups of relevant QoS mechanisms in accordance with the adjusted parameters comprises:
   determining a predicted positive effect of implementing the at least one of the groups of relevant QoS mechanisms;
   determining a predicted negative effect of implementing the at least one of the groups of relevant QoS mechanisms; and
   wherein selecting one of the at least one of the groups of relevant QoS mechanisms based on the predicted effectiveness comprises selecting one of the at least one of the groups of relevant QoS mechanisms with a highest ratio of the predicted positive effect to the predicted negative effect.

20. The computer-readable medium of claim 14, the method further comprising re-selecting one of the groups of relevant QoS mechanisms to be implemented upon an occurrence of a trigger.

* * * * *